April 6, 1971          H. DENKS          3,574,035
DEVICE FOR PRODUCING MULTITUBULAR STRUCTURES
Filed July 18, 1967
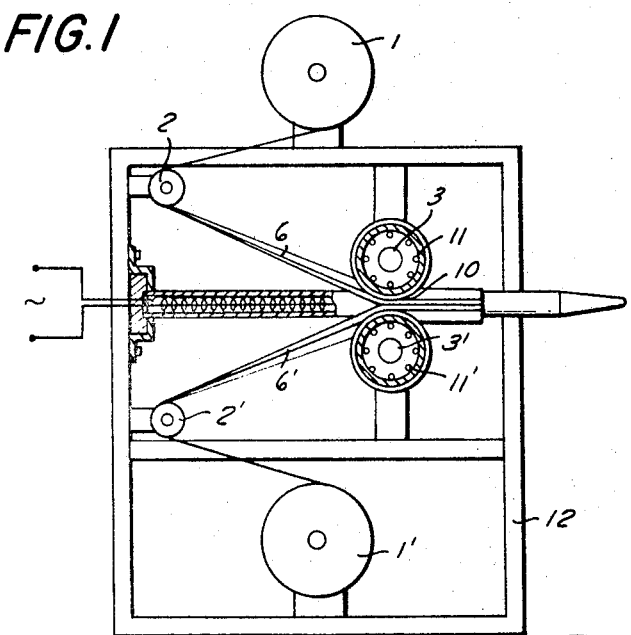
FIG.1
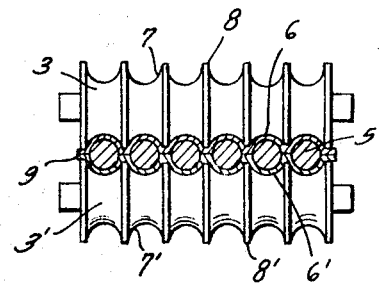
FIG.3
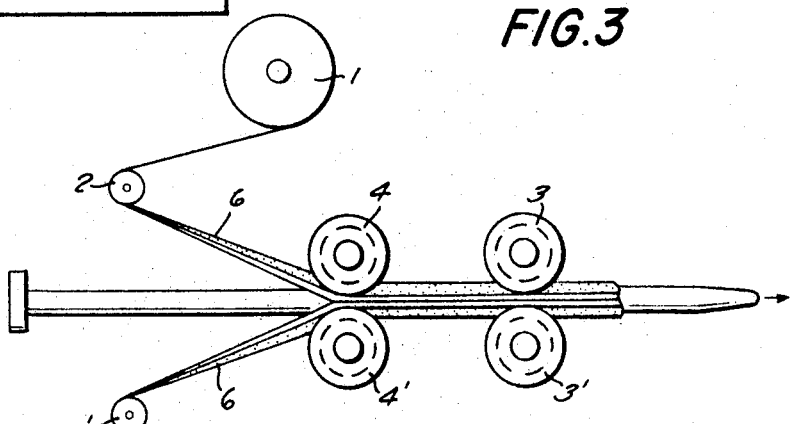
FIG.2
FIG.8
Hans Denks
Lutz Horn
Josef Sucher,
INVENTORS
BY Michael S. Sheker
ATTORNEY

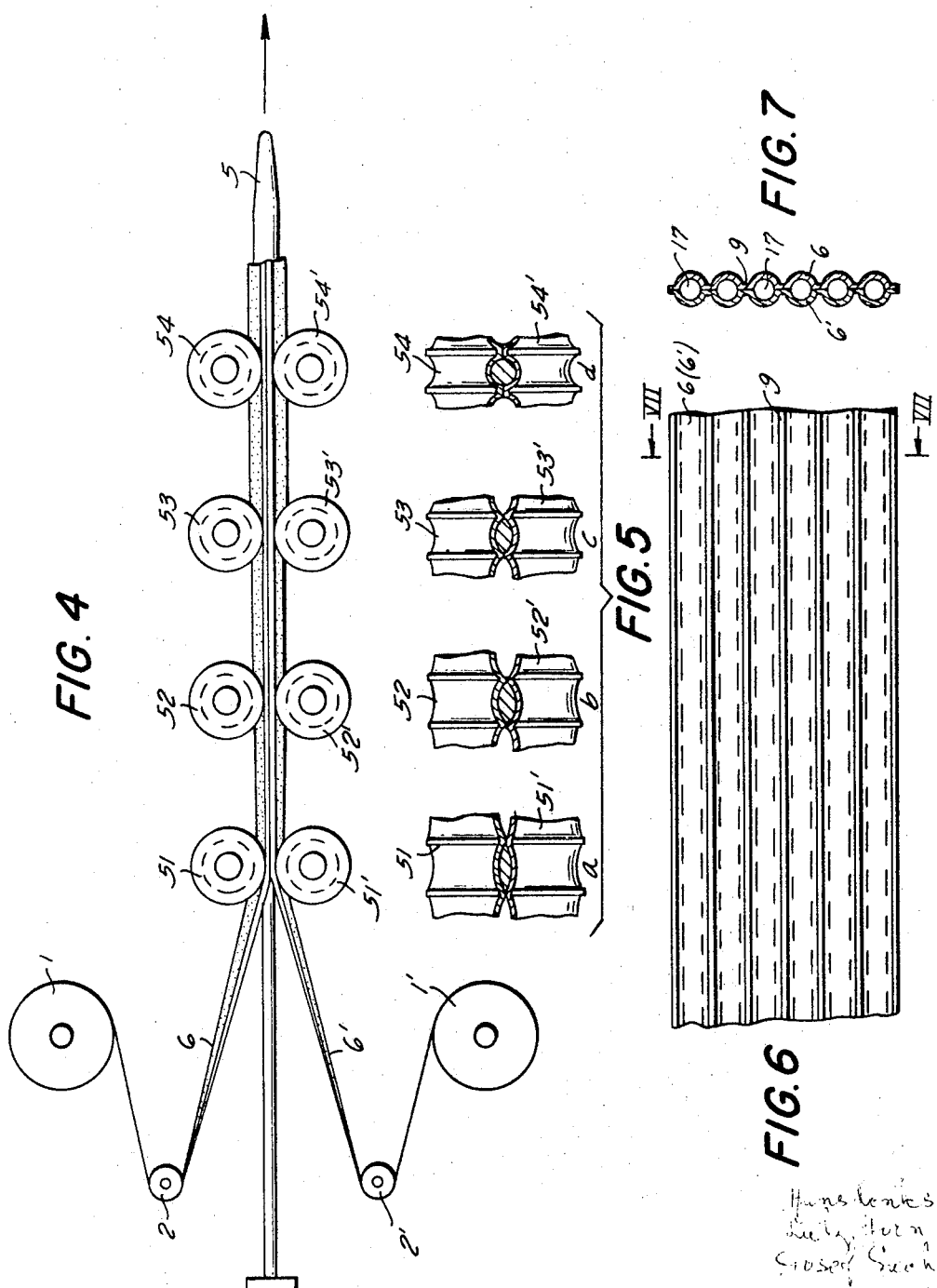

United States Patent Office 3,574,035
Patented Apr. 6, 1971

3,574,035
DEVICE FOR PRODUCING MULTI-TUBULAR STRUCTURES
Hans Denks, Rheydt, Lutz Horn, Erlangen, and Josef Sucher, Hagen, Germany, assignors to Varta Aktiengesellschaft, Frankfurt am Main, Germany
Filed July 18, 1967, Ser. No. 654,097
Claims priority, application Germany, July 22, 1966, V 31,562
Int. Cl. B32b 31/08
U.S. Cl. 156—462     7 Claims

ABSTRACT OF THE DISCLOSURE

A multi-tubular structure, for instance the pockets for pocket electrodes, is produced by concurrently moving two webs at equal speed along adacent but spaced paths and causing, during such moving of the two webs, transversely spaced juxtaposed portions thereof to come in contact with each other while preventing contact between the intermediate portions of the two webs. The contacting portions are adhered to each other, so that longitudinally extending, transversely spaced adhering portions of the two webs form therebetween elongated pockets. This is accomplished in a device wherein the two superposed webs are passed between a pair of form rollers which turn about parallel axes, whereby each of the form rollers has a plurality of adjacent peripheral grooves separated by annular rims, and the distance between the axes of the form rollers is such that at the nip of the rollers the annular rims are in close proximity so that the grooves between the rims will define a plurality of substantially closed passages of the desired cross-section of the outer surfaces of the tubular portions of the multi-tubular structure. A plurality of rods is stationarily arranged so as to extend through the passages without contacting the walls of the grooves, and the two webs are passed between the rollers through the passages so that in the zones of the rims the webs will contact each other and will be adhered to each other by compression, heat or in any other suitable manner, while the rods interposed between adjacent juxtaposed rims will force the web portions against the inner wall of the grooves thereby shaping the tubular pockets.

BACKGROUND OF THE INVENTION

The invention relates to a method and device for producing from two distinct webs which are adhered to each other for instance by welding or adhesively, multi-tubular structures and, more particularly, to the continuous production of pockets for tubular electrodes, for instance for use in lead acid batteries.

The multi-tubular electrode pockets for lead acid batteries were produced up to now by providing two superposed webs of suitable material, fabrics or fleece, at the desired distances with weld seams or seams formed by sewing, followed by inserting rods or mandrels between adjacent seams, and thereafter subjecting the thus formed structure to an elevated temperature at which the material of the webs will become shape-retaining.

It has also been proposed to pass conventional tubular fabric structures over stationary mandrels while simultaneously heating the tubular fabric or the like, whereby the fabric has to be moved over the mandrels by special holding and moving devices and the mandrels must be maintained in position and supported by special pairs of rollers.

These conventional methods are connected with various very significant disadvantages. Thus, it is required to start with fabrics or webs of material which by sewing, welding or weaving were adhered to each other along longitudinal seams between which the pockets were to be formed. For producing multi-tubular pockets of these semi-finished goods, the latter still have to be shaped by means of special devices, this involves considerable work, and further expenses are connected with the unavoidable manual processing required by these methods.

It is an object of the present invention to provide a substantially completely mechanized continuous process for producing pockets for multi-tubular electrodes and the like, and to provide a device for carrying out such process, whereby the starting material for producing such multi-tubular structures may be simply webs of fleece, fabric, foil, knitted material or the like.

SUMMARY OF THE INVENTION

The difficulties of prior art methods, as discussed above, are overcome according to the present invention by a continuous process of producing the multi-tubular structure by concurrently moving two webs at equal speed along adjacent but spaced paths, causing during such moving a plurality of transversely spaced, juxatposed portions of the web to contact each other while preventing contact between juxtaposed portions of the webs located between the transversely spaced portions thereof, and adhering the juxtaposed, contacting, transversely spaced portions of the webs to each other, so as to form a multi-tubular structure extending in the direction of movement of the webs. The juxtaposed, contacting, transversely spaced portions of the webs may be adhesively adhered to each other or may be adhered to each other by compression, or by a combination of adhesive adherence and compression. Adhesive adhereance may be achieved by applying an adhesive at the surface portions of the webs which are to be adhered to each other, or by forming the webs at least partially of thermoplastic material and applying heat along the portions of the webs which are to be adhered to each other.

This method is carried out, according to the present invention, in a device which comprises support means, a pair of form rollers turnably mounted on the support means for rotation about substantially parallel axes, each of the form rollers having a plurality of adjacent peripheral grooves separated by annular rims, and the distance between the axes of the grooves defining at the nip of two rollers a plurality of substantially closed passages of a given cross-section corresponding to the outer surfaces of the tubular portion of the multi-tubular structure, and the rims defining a cross-section corresponding to the contacting portions of the two webs, a plurality of rods supported on the support means and respectively extending through the passages and having a cross-section which may be similarly shaped but is smaller than the cross section of the passages, respectively, so as to confine between inner surfaces of the grooves and outer surfaces of the rods the walls of the tubular structure, and guide means for guiding a pair of webs between the nip of the rollers and the outer surfaces of the rods.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic elevational view of a device according to the present invention;
FIG. 2 is a schematic elevational view illustrating on an enlarged scale certain modifications of the device illustrated in FIG. 2;

FIG. 3 is an elevated view of the form roller arrangement of FIG. 1 taken in a direction transverse to that of FIG. 1;

FIG. 4 is a schematic elevational view similar to that of FIG. 2, however, illustrating a further embodiment of the present invention;

FIGS. 5a–5d are fragmentary elevational views of the corresponding portions of the device illustrated in FIG. 4 taken in a direction transverse to that of the showing in FIG. 4;

FIG. 6 is a plan view of the multi-tubular electrode pocket structure produced in the device as illustrated in FIGS. 1–5;

FIG. 7 is a cross sectional view along line VII—VII of FIG. 6; and

FIG. 8 is an elevational view, partially in cross section, of one of the form rollers of FIG. 1 taken in a direction transverse to the showing of FIG. 1.

DESCRIPTION OF THE PREFERRED EMBODIMENTS

As will be described in more detail in connection with the drawings, according to the present invention, two webs are passed from storage rolls or the like over guide rollers through the nip between a pair of form rollers, whereby the two webs, while passing through the nip between the pair of form rollers, will be adhered to each other along longitudinal lines which are transversely spaced from each other by a distance substantially corresponding to the desired diameter of the individual tubes of the multi-tubular body which is to be produced. Adherence along transversely spaced longitudinal portions of the two webs is accomplished by pressure and/or heat so as to either weld the contacting transversely spaced portions of the two webs to each other, or to activate adhesive material of the contacting portions.

Within the double-grooves defined by the pair of form rollers in the nip between the rollers, or in the passage between the two rollers of the pair of rollers, rods are rigidly arranged, which rods, respectively, have cross sections in the zone of the passage between the rollers, which correspond substantially to the inner cross section of the individual tubes of the multi-tubular structure which is to be produced.

As binding agent for the adhesive adherence or for the welding of the two webs to each other may serve either the material of the webs which, in such case, must be of sufficient thickness and must be suitable for being welded or activated so as to become actively adhesive, or it is also within the scope of the present invention to apply a binding or fluxing agent to at least the portions of the webs which will contact each other in the nip between the pair of rollers. Such binding or fluxing agent may be applied in pulverulent form and may consist, for instance, of pulverulent latently adhesive synthetic materials, or may consist of staple fibers formed of latently adhesive synthetic material, or the two webs of material may be impregnated, prior to being passed through the form rollers, with suitable synthetic materials which may be applied as solutions, emulsions or suspensions.

The webs indicated in the drawing by reference numerals 6 and 6' may be fleece, fabrics, foils, knitted textiles or the like, and may be formed, for instance, of polyesters, such as the material commercially available under the trade mark "Dacron," polyolefins, for instance polypropylene such as the products commercially available under the trademarks "Prolene" and "Oppanol" or polyethylene, or may consist of polyvinylchloride or polyvinylidene chloride, for instance the products commercially available under the trademarks "Thovil" and "Saran," or polyacrylonitriles, for instance the product commercially available under the trademark "Orlon," or polymethacrylates, for instance, the product commercially available under trademark "Plexy" or polybutadiene and derivatives thereof, for instance isoprene and natural latices, or the products commercially available under the trademarks "Buna" and "Allopren" or polystyrene, for instance, the product "Polystyrol Basf," or polycarbonates, for instance, the product commercially available under the trademark "Makrolon" or mixed and copolymerizates of the materials mentioned above, such as are for instance commercially available under the trademarks "Dynel," "Buna S," "Sopo," "Creslan" as well as other so-called modacrylics and ABS-polymerizates, for instance, the product commercially available under the trademark "Novodur."

Suitable binding agents for adhesively adhering or welding of the two webs of material to each other include phenoplasts of the resol-type, for instance, the products commercially available under the trademarks "Resinol." "Sarpifan," and "Atephen"; furthermore, prebinders and fiber preparations for initiating and improving fiber adhesion and stiffening, for instance the product commercially available under the trademark "Palatal" prebinder; silicon resins, for instance, the silicon resin emulsion commercially available under the trademark "RK," phthalic acid esters, for instance, the products commercially available under the trademarks "Palatinol," and "Ultramoll," and unsaturated polyester resins, for instance, the product commercially available under trademark "Palatal."

Pulverulent materials which may be applied to the webs for binding the same to each other include resols, for instance, the product commercially available under the trademark "Sarpisan," polyolefins, for instance, the product commercially available under the trademark "Lupolan-Powder," and polystyrenes, for instance, the product commercially available under the trademark "Polystyrene EF."

Synthetic fibers which may be used as binding agents, include the fibers commercially available under the trademarks "Rhovil," "Verel," "Kodel," and "Hostalen" as well as polyethylene fibers. Good results are obtained with fibers having a length of 40 mm. and a thickness of about 0.04 mm.

The binding agent may be applied in the form of, for instance, a solution of unsaturated polyester resins in vinyl compounds, for instance, of the unsaturated polyester resin commercially available under the trademark "Palatal"; or the solution may be a solution of a phenolic resin in an organic solvent, for instance, of the type known as "Novolaks."

The binding agent may also be applied in the form of an emulsion, for instance, by using emulsifiers, such as the emulsifier commercially available under the trademark "K 30" which consists of concentrated and coagulate-free finely distributed synthetic material in water, most frequently vinyl derivatives, or silicon resins such as silicon resin emulsions known under the trademark "RK."

Furthermore, as pointed out above, the binding agent may also be applied in the form of a dispersion thereof, for instance, as a so-called synthetic latice, such as the "Akronal" dispersions "ID" up to "40 D."

Referring now to the drawing, and particularly to FIG. 1, it will be seen that two webs 6 and 6', each having the desired width, are supplied from storage rolls 1 and 1' and passed by way of guide rollers 2 and 2' into the nip 10 between form rollers 3 and 3', which form rollers may be heated by oil, gas, steam or electrically. As illustrated, the form rollers 3 and 3' are heated by means of conventional electrical coils 11 and 11'.

Rollers 3 and 3' are turnable about parallel axes and, for the sake of clarity, the conventional means for rotating rollers 3 and 3' are not shown. The distance or rollers 3 and 3' from eaech other is adjusted as will be described further below.

The temperatures at the periphery of rollers 3 and 3' may be adjusted in conventional manner and so as to correspond to the temperature requirements for adhering the webs of the specific material being processed.

As illustrated in FIG. 3, rollers 3 and 3' are formed in axial direction on their periphery with a plurality of adjacent annular grooves 7 and 7', spaced from each other by annular rims 8 and 8'. The corresponding grooves of rollers 3 and 3' form between adjacent rims 8 and 8' a plurality of passages. The inner faces or walls of the pair of grooves forming a passage, corresponds to the desired outer dimensions of a tube of the multi-tubular structure. In order to produce tubes having uniform and smooth inner faces, and in order to obtain the desired rigidity of the tubular walls of the multitubular structure, heatable rods 5 having cross-sectional dimensions corresponding to the desired inner dimensions of the tubes of the multi-tubular structure, are rigidly arranged within each of the passages between juxtaposed grooves of rollers 3 and 3'. These rods are accessible from one side for the introduction and withdrawal of energy, i.e., for heating of the rods, and are fixed to support 12 so as to permit each observation of the process as well as quick replacement of the rods, should such replacement become necessary.

Again, as illustrated in FIG. 3, the individual rods 5 so arranged as not to contact the walls of grooves 7 and 7'. The webs are now passed through the slit formed between the grooves of the rollers and the rods. Within the nip between rollers 3 and 3', the webs 6 and 6' will adjust themselves to the inner face of grooves 7 and 7' and the outer face of rods 5, and since the rollers and possible also rods, are heated, the webs will be compacted and adhesively adhered or welded to each other under the influence of pressure and temperature at the zones of juxtaposed rims 8 and 8', formed in the nip of the rollers with faces which are only slightly spaced from each other.

Furthermore, means are preferably provided, which are conventional per se and not illustrated in the drawing. for adjusting the distance between rollers 3 and 3', for instance by having rollers 3' rotate about a stationary axis, whereas the distance of the axis of roller 3 from the axis of roller 3' may be pneumatically or hydraulically changed in conventional manner, so as to, if desired, press the web portions between rims 8 against each other. The pressure to be exerted by this arrangement can be chosen as desired, taking into consideration the specific characteristics of the material of the two webs 6 and 6' which are to be adhered to each other.

In order to facilitate the welding or adhering or melting together of the longitudinal portions of webs 6 and 6' which will contact rims 7 and 7', preferably the peripheral faces 18 and 18' of rims 8 and 8' are formed with small projections and indentations which, in the nature of an embossing arrangement, will increase the contacted surface area of the webs. This is specifically illustrated in FIG. 8, wherein the heating of roller 3 by means of a conventional electric resistance heating arrangement 19 is also shown.

The material leaving the roller arrangement 3–3' will now be in the form of an endless tubular structure as illustrated in FIGS. 6 and 7. It will be seen that the multi-tubular structure formed of webs 6 and 7 includes a plurality of tubular bodies 17 whereby adjacent tubular bodies 17 are connected to each other by composite web portions 66.

It may be noted here that a further advantage of providing peripheral faces 18 of rims 8 with small projections or indentations will be found in a more even forward passage of the thus formed multi-tubular structure due to the gripping action of these small projections and indentations on the compressed and combined web portions 66, which are thus forced forward in the direction of rotation of rollers 3 and 3'.

The endless, multi-tubular structure illustrated in FIG. 6 is then passed forwardly by means of conventional conveying devices to a mechanically controlled cutting arrangement and is cut to the desired longitudinal and transverse dimensions.

In the case of certain types of webs, it is advantageous to carry out the deformation of the webs and the forming of the multi-tubular structure in a series of steps, for instance, as illustrated in FIGS. 4 and 5.

For working up webs of certain materials, it is advantageous to preform the webs prior to passing the same through the nip between the form rollers.

This may be accomplished, as illustrated in FIG. 2, by passing the webs, prior to passage thereof through the pair of form rollers 3 and 3', through another pair of rollers which may be heated or not heated, may be driven or rotatable, which pair of preforming rollers is indicated in FIG. 2 by reference numerals 4 and 4'. Other conventional preforming devices may also be used, provided they will serve for preforming the two webs without creasing the same, thus preparing the webs for the final forming between rollers 3 and 3'.

Depending on the web-forming material and the desired physical charactersitics of the finished product, it may also be desirable to proceed as illustrated in FIGS. 4 and 5, namely by arranging a plurality of pairs of rollers for preforming and final forming of the multi-tubular body.

Preferably, one and the same rod extends through successive passages of the series of pairs of rollers, and the shape of the passages formed by the respective juxtaposed grooves of the various pairs of rollers, as well as the cross-sectional shape of the rods will progressively change in the sequence of the rollers, so that gradually the tubular space between the passages and the rod, through which the webs have to pass, will more and more closely approximate the tubular shape of the passage of the last pair of rollers, i.e., the actual forming rollers, corresponding to the desired final shape of the multi-tubular structure.

As illustrated in FIGS. 4 and 5, the forming of the multi-tubular structure is carried out in four sequentially arranged pairs of rollers. Rods 5 and the coordinated pairs of rollers 51–51', 52–52', 53–53', and 54–54', define passages of substantially annular cross section and differing shape, as illustrated in FIGS. 5a–5d.

Thus, for instance, in the case of certain web materials, the deformation will be carried out in a more careful manner and avoiding undue extension of the material by starting with the substantially elliptic passage of FIG. 5a, and progressively changing the elliptic shape of the passage towards the circular shape of FIG. 5d. The uniform and even change from the elliptic tubular configuration to the circular tubular configuration of the final product can be best obtained by proceeding substantially as illustrated in FIGS. 4 and 5, i.e., by stepwise, gradual deformation of the two webs under simultaneous adherence of the same to each other at the portions thereof which will be contacted by the rims of the respective pairs of rollers.

To proceed in the manner described above has certain substantial advantages over prior art methods. It is possible to carry out the process of the present invention in the arrangement as described herein in a continuous manner and the present process is applicable with respect to a very great number of different web-forming materials and combinations thereof. It is also possible to produce, as described above, multi-tubular bodies, the walls of which are multi-layered walls.

The entire process is carried out in a single step, i.e., the webs are fed into one end portion of the device and at the other end thereof the completed endless product is withdrawn. Use of the conventionally required auxiliary and frequently expensive machinery is not required. Furthermore, it is not necessary to introduce the rods by hand, as had to be done in accordance with the conventional methods generally used up to now. Relatively little space is required for the entire process.

Due to the fact that the method of the present invention permits the working up of webs of a very great variety of materials or combinations of materials, it is possible to produce multi-tubular structures such as the pockets for electrodes of lead acid storage batteries, so as to meet the most exacting specifications, and thereby to adjust the function of the positive plates of such storage battery and thus the entire cell to the practical requirements which are to be met in any given case.

It will be understood that each of the elements described above, or two or more together, may also find a useful application in other types of tube forming devices differing from the types described above.

While the invention has been illustrated and described as embodied in a device for producing multi-tubular structures, it is not intended to be limited to the details shown, since various modifications and structural changes may be made without departing in any way from the spiirt of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A device for the continuous production of a multi-tubular structure, said device comprising, in combination, support means; a pair of form rollers turnably mounted on said support means for rotation about substantially parallel axes, each of said form rollers having a plurality of adjacent peripheral grooves separated by annular rims and the distance between said axes being such that said grooves define at the nip of the two rollers a plurality of substantially closed passages of a given cross-section corresponding to the outer surface of the tubular portion of said multi-tubular structure, and said rims defining a cross-section corresponding to the contacting portions of said multi-tubular structure; a plurality of rods stationarily supported on said support means and respectively extending through said passages and having one end fixedly connected to said support means and the other end being a tapered free end of decreasing diameter outside the respective passages and a cross-section which is similarly shaped but smaller than the cross-section of said passages, respectively, so as to confine between inner surfaces of said grooves and outer surfaces of said rods the walls of said tubular structure; guide means for guiding a pair of webs between the nip of said rollers and the outer surfaces of said rods; and heating means structurally connected with said fixed ends of the respective rods for heating said rods along their respective lengths.

2. A device as defined in claim 1 and including additional heating means for heating at least the peripheral portions of said pair of form rollers.

3. A device as defined in claim 1, wherein said annular rims of said pair of form rollers terminate in outer faces formed with small projections and indentations.

4. A device as defined in claim 1 and including preforming means arranged on said support means for preforming said webs prior to passage of the same through the nip of said pair of form rollers.

5. A device as defined in claim 4, wherein said preforming means comprises at least one second pair of form rollers arranged on said support means upstream of the first mentioned pair of form rollers in the direction of passage of said webs, for preforming said webs during passage of the same through said second pair of form rollers prior to passage of the thus preformed webs through said first mentioned pair of form rollers.

6. A device as defined in claim 5, wherein said preforming means comprise a plurality of sequentially arranged pairs of preforming rollers turnably mounted on said support means for rotation about substantially parallel axes, each of the preforming rollers of said preforming means having a plurality of adjacent peripheral grooves separated by annular rims and the distance between the axes of each pair of preforming rollers, respectively, being such that the grooves defined at the nip of the two rollers of the respective pair of preforming rollers define a plurality of substantially closed passages of given cross-sections progressively changing configuration, and said rims of the preforming rollers of each pair of said preforming rollers define a cross-section corresponding to the contacting portions of said two webs, said preforming means further including a plurality of additional rods supported on said support means and respectively extending through respectively successively arranged passages of said sequentially arranged pairs of preforming rollers, said additional rods being integral with the rods extending through the passages of said form rollers and having, respectively, a cross-section of progressively changing configuration, similarly shaped but smaller than the cross-section of the directly associated closed passages between the pairs, respectively of said preforming rollers, so as to confine between inner surfaces of said grooves and the outer surfaces of said additional rods of said preforming means the walls of said tubular structure and to transform said webs during passage through said preforming means from substantially planar shape to a shape approaching that defined by the inner surfaces of the grooves and the outer surfaces of the rods associated with said pair of form rollers.

7. A device as defined in claim 6, and including further heating means for heating at least the peripheral portion of at least one of the rollers of said preforming means.

References Cited

UNITED STATES PATENTS

| | | | |
|---|---|---|---|
| 2,277,473 | 3/1942 | Anderson | 29—477.7 |
| 2,255,472 | 9/1941 | Quarnstrom | 156—201X |
| 2,374,504 | 4/1945 | Salfisberg | 156—553X |
| 2,912,043 | 11/1959 | Bargholtz et al. | 156—463X |
| 3,082,292 | 3/1963 | Gore | 156—553UX |
| 3,158,181 | 11/1964 | Gore | 156—553X |
| 3,449,157 | 6/1969 | Wandel | 156—210X |

FOREIGN PATENTS

| | | | |
|---|---|---|---|
| 582,705 | 9/1958 | Italy | 156—553 |

BENJAMIN R. PADGETT, Primary Examiner

H. E. BEHREND, Assistant Examiner

U.S. Cl. X.R.

156—201, 292, 463